United States Patent
Dou et al.

(10) Patent No.: US 7,548,208 B2
(45) Date of Patent: Jun. 16, 2009

(54) INTERNAL DIVERSITY ANTENNA ARCHITECTURE

(75) Inventors: Weiping Dou, Milpitas, CA (US); Stephen Senatore, So. San Francisco, CA (US); Arthur Zarnowitz, San Jose, CA (US)

(73) Assignee: Palm, Inc., Sunnyvale, CA (US)

( * ) Notice: Subject to any disclaimer, the term of this patent is extended or adjusted under 35 U.S.C. 154(b) by 12 days.

(21) Appl. No.: 11/361,860

(22) Filed: Feb. 24, 2006

(65) Prior Publication Data

US 2007/0200773 A1    Aug. 30, 2007

(51) Int. Cl.
*H01Q 1/24* (2006.01)

(52) U.S. Cl. ...................................... 343/702

(58) Field of Classification Search .................. 343/702, 343/847, 725, 700 MS, 729, 749–751; 455/552.1
See application file for complete search history.

(56) References Cited

U.S. PATENT DOCUMENTS

| | | | | |
|---|---|---|---|---|
| 5,138,328 A * | 8/1992 | Zibrik et al. | ................. | 343/702 |
| 5,740,526 A * | 4/1998 | Bonta et al. | ............... | 455/277.2 |
| 5,828,346 A * | 10/1998 | Park | ........................... | 343/826 |
| 5,905,473 A * | 5/1999 | Taenzer | ...................... | 343/834 |
| 6,380,903 B1 * | 4/2002 | Hayes et al. | ................. | 343/725 |
| 6,417,809 B1 * | 7/2002 | Kadambi et al. | ............ | 343/702 |
| 6,882,317 B2 * | 4/2005 | Koskiniemi et al. | ... | 343/700 MS |
| 6,924,770 B2 * | 8/2005 | Carpenter et al. | ........... | 343/702 |
| 6,965,346 B2 * | 11/2005 | Sung et al. | .................. | 343/702 |
| 6,980,154 B2 * | 12/2005 | Vance et al. | .......... | 343/700 MS |
| 7,061,430 B2 * | 6/2006 | Zheng et al. | .......... | 343/700 MS |
| 7,167,691 B2 * | 1/2007 | Kim et al. | .................... | 455/101 |
| 2002/0154066 A1 * | 10/2002 | Barna et al. | ................. | 343/906 |
| 2003/0210199 A1 * | 11/2003 | Sward et al. | ................. | 343/795 |
| 2003/0214446 A1 * | 11/2003 | Shehab | ....................... | 343/702 |
| 2004/0051669 A1 * | 3/2004 | Rutfors et al. | .............. | 343/702 |
| 2004/0092285 A1 * | 5/2004 | Kodim | ..................... | 455/552.1 |
| 2004/0125030 A1 * | 7/2004 | Sung et al. | .................. | 343/702 |
| 2006/0071864 A1 * | 4/2006 | Richard et al. | ............. | 343/702 |
| 2006/0290575 A1 * | 12/2006 | Pelzer | ........................ | 343/702 |

FOREIGN PATENT DOCUMENTS

WO    2007101100 A2    9/2007

* cited by examiner

*Primary Examiner*—Huedung Mancuso
(74) *Attorney, Agent, or Firm*—Kacvinsky LLC (57) ABSTRACT

Various embodiments of an internal diversity antenna architecture are described. In one embodiment, a wireless device may include a housing enclosing a printed circuit board, a first diversity antenna, and a second diversity antenna internal to the housing. The second diversity antenna may be positioned substantially near the bottom of the housing or the bottom the printed circuit board. Other embodiments are described and claimed.

19 Claims, 4 Drawing Sheets

INTERNAL DIVERSITY ANTENNA ARCHITECTURE

BACKGROUND

A wireless device typically operates using a radio transmitter/receiver ("transceiver") and one or more antennas. Recently, diversity antennas have been applied to wireless devices such as mobile telephones and handheld computers. In general, diversity antennas are based on the concept of a smart array and tend to improve the receiving sensitivity of a wireless device by reducing multi-path interference.

Figure 1:
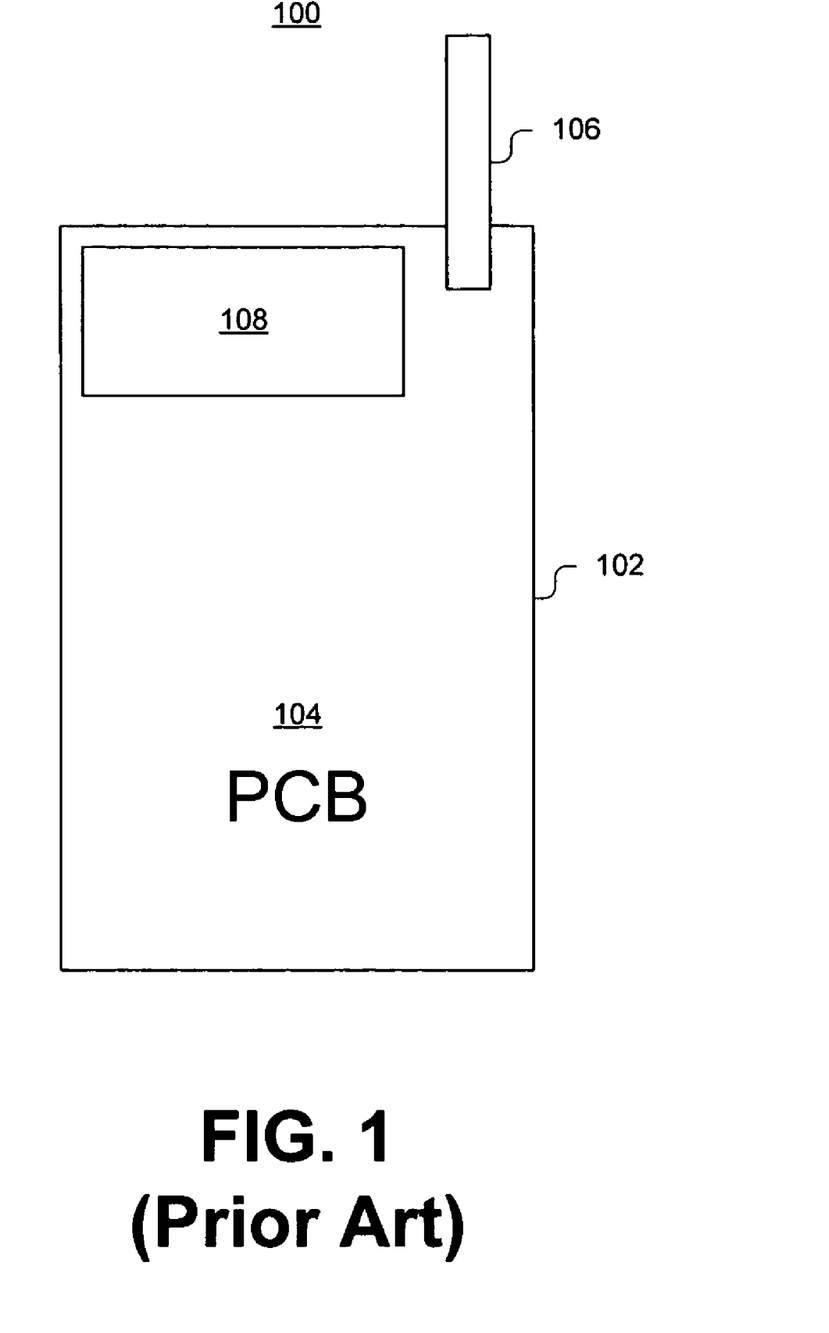
FIG. 1 illustrates a wireless device having a conventional diversity antenna architecture.

FIG. 1 illustrates a wireless device 100 having a conventional diversity antenna architecture. As shown, the wireless device 100 comprises an external housing 102 and a printed circuit board (PCB) 104. The diversity antenna architecture includes an external antenna 106 and an internal antenna 108 having different polarized radiation patterns to reduce mutual coupling and allow cooperative operation.

Antenna orientation for a given wireless device is an important design consideration and is often limited by strict performance constraints. For example, some antenna placements may be undesirable since they may increase the overall size and shape of the wireless device. In addition, some external antenna placements may expose the antenna to potential damage. Further, some extendable antennas may provide reduced performance, and in some cases may not provide any performance at all, when in a retracted or closed position. Such problems may be further exacerbated for those wireless devices with smaller form factors such as a mobile telephone or handheld computer. Consequently, there may be a need for improvements in antenna design.

DETAILED DESCRIPTION

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Various embodiments may be directed to an internal diversity antenna architecture that may potentially improve the performance of a wireless device by improving one or more of characteristics, such as a size, shape, form factor, power consumption, battery life, transceiver operations, signal quality, weight, and other characteristics of the wireless device. For example, various embodiments may provide improved performance without specific absorption rate (SAR) degradation and enough spatial polarization for reducing mutual coupling. In various implementations, the described embodiments may provide flexibility for low-profile, small and compact device designs. Accordingly, a user may realize enhanced products and services.

Figure 2A:
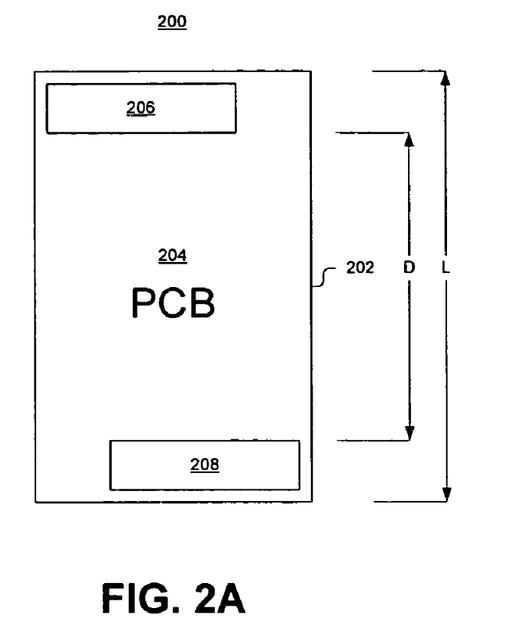
FIG. 2A illustrate one embodiment of a wireless device having an internal diversity antenna architecture.

FIG. 2A illustrates one embodiment of a wireless device 200 having an internal diversity antenna architecture. The wireless device 200 may comprise, or be implemented as a handheld computer, mobile telephone, personal digital assistant (PDA), combination cellular telephone/PDA, data transmission device, one-way pager, two-way pager, and so forth. Although some embodiments may be described with wireless device 200 implemented as a handheld computer by way of example, it may be appreciated that other embodiments may be implemented using other wireless handheld devices as well.

In various embodiments, the wireless device 200 may comprise a housing 202 and a PCB 204. The housing 202 may include one or more materials such as plastic, metal, ceramic, glass, and so forth, suitable for enclosing and protecting the internal components of the wireless device 202. The PCB 204 may comprise materials such as FR4, Rogers R04003, and/or Roger RT/Duroid, for example, and may include one or more conductive traces, via structures, and/or laminates. The PCB 204 also may include a finish such as Gold, Nickel, Tin, or Lead. In various implementations, the PCB 204 may be fabricated using processes such as etching, bonding, drilling, and plating.

As shown in FIG. 2A, the wireless device 200 may have an internal diversity antenna architecture comprising a first internal antenna 206 and a second internal antenna 208 disposed on the PCB 204 for achieving diversity. In various embodiments, the first internal antenna 206 and the second internal antenna 208 may remain in a fixed position internal to the housing 202 in order to eliminate the need for an external antenna and reduce the overall size and bulkiness of the wireless device 200. In one embodiment, the internal diversity antenna architecture may comprise a first internal antenna 206 located substantially near the top of the wireless device 200. For example, the first internal antenna 206 may be located substantially near the top of the housing 202 and/or the top of the PCB 204. The internal diversity antenna architecture may comprise a second internal antenna 208 located substantially near the bottom of the wireless device 200. For example, the second internal antenna 208 may be located substantially near the bottom of the housing 202 and/or the bottom of the PCB 204.

In various embodiments, the first internal antenna 206 may comprise a primary antenna and the second internal antenna 208 may comprise a secondary antenna disposed within the housing 202 of the wireless device 200. The first internal antenna 206 and the second internal antenna 208 may have varying polarities to implement one or more diversity techniques. In one embodiment, for example, the first internal antenna 206 may be vertically polarized. In this case, the second internal antenna 208 may be mainly horizontally polarized or vertically polarized with a cross-polarization component.

The first internal antenna 206 and the second internal antenna 208 may be arranged to transmit and/or receive electrical energy in accordance with a given set of performance or design constraints as desired for a particular implementation. In various embodiments, the first internal antenna 206 and the second internal antenna 208 may operate at the same time for transmitting, receiving, or both. During transmission, an antenna may accept energy from a transmission line and radiate this energy into space via a wireless shared media. During reception, an antenna may gather energy from an incident wave received over wireless shared media, and provide this energy to a corresponding transmission line. The amount of power radiated from or received by an antenna is typically described in terms of gain. In addition, an antenna may operate in accordance with a desired Voltage Standing Wave Ratio (VSWR) value. For example, VSWR relates to the impedance match of an antenna feed point with a feed line or transmission line of a communications device. To radiate radio frequency energy with minimum loss, or to pass along received RF energy to a wireless receiver with minimum loss, the impedance of an antenna may be matched to the impedance of a transmission line or feed point of a PCB.

In some embodiments, the primary antenna (e.g., first internal antenna 206) may be configured for transmission, and both the primary antenna (e.g., first internal antenna 206) and the secondary antenna (e.g., second internal antenna 208) may be configured for reception. Such an arrangement may be used in a cellular phone for improving data rate.

In some embodiments, the primary antenna (e.g., first internal antenna 206) and the secondary antenna (e.g., second internal antenna 208) may be configured for both transmission and reception. Such and arrangement could be used in WiFi or WiMax, for example, to improve data rate as well as voice service. Moreover, this arrangement may reduce multipath interference, improve coverage, and increase system capacity. The embodiments are not limited in this context.

The first internal antenna 206 and the second internal antenna 208 may be tuned for operating at one or more frequency bands. For example, the first internal antenna 206 and the second internal antenna 208 may allow the wireless device 200 to operate in the 824-894 Megahertz (MHz) frequency band for GSM operations, the 1850-1990 MHz frequency band for Personal Communications Services (PCS) operations, the 1575 MHz frequency band for Global Positioning System (GPS) operations, the 824-860 MHz frequency band for NAMPS operations, the 1710-2170 MHz frequency band for WCDMA/UMTS operations, ISM band in 2.4 GHz range for WiFi and Bluetooth, and other frequency bands. This may be desirable since the wireless device 200 may be compatible with multiple wireless data, multimedia and cellular telephone systems. In addition, first internal antenna 206 and the second internal antenna 208 may be used to implement various spatial diversity techniques to improve communication of wireless signals across one or more frequency bands of wireless shared media.

In various embodiments, the first internal antenna 206 and the second internal antenna 208 may be designed for Evolution Data Optimized (EVDO) diversity at both the 800 MHz band (cellular) and the 1900 MHz (PCS). In various implementations, for EVDO diversity, the efficiency may be approximately 50% at 850 MHz and 60% at 1900 MHz.

In the embodiment shown in FIG. 2A, for example, the length (L) of the wireless device 200 may be greater than 0.3 wavelength (>0.3λ) of the lowest frequency, and the first internal antenna 206 and the second internal antenna 208 may be separated by a distance (D) that is no less than the quarter wavelength (>=λ/4) of the lowest frequency. In various implementations, the isolation or mutual coupling may be −12 dB or better at 850 MHz and −20 dB or better at 1900 MHz.

In various embodiments, the first internal antenna 206 and/or the second internal antenna 208 may comprise a single antenna, or may be part of an array of antennas, such as a quad band antenna array. In some cases, an antenna may comprise multiple layers and multiple antenna traces formed by chemical etching, metal etching, and other similar techniques. The actual number of layers, and length of each individual layer, may vary for a particular implementation. The antenna traces may have any suitable pattern or geometry tuned for various operating frequencies. For example, the antenna traces may comprise one or more center lines and/or branch lines. Phase lines and/or various chip components, such as resistors, capacitors or inductors, may be used among the center lines and/or branch lines. The different elements may be contacted or parasitic.

In various embodiments, the first internal antenna 206 and/or the second internal antenna 208 may comprise a flexible material or substrate. A flexible material may include any pliant material that is capable of being bent or flexed such as a flexible printed circuit (FPC). Other flexible materials may be used, however, such as a wire material, helical material, Teflon material, RF4 material, Mylar material, dielectric substrate, a soft plastic material, and other flexible materials. The embodiments are not limited in this context.

In some embodiments, the first internal antenna 206 and/or the second internal antenna 208 may comprise a rigid material rather than a flexible material. A rigid material may include any material that is deficient in or devoid of flexibility. Examples of rigid materials may include metal materials, plastic materials, ceramic materials, and so forth. In one embodiment, for example, the first internal antenna 206 and/or the second internal antenna 208 may be formed using a flat stamped metal having suitable characteristics to match the design and performance constraints for the wireless device 200.

In various embodiments, the first internal antenna 206 and/or the second internal antenna 208 may be implemented using any type of suitable internal antenna, such as a planar inverted-F antenna, a planar inverted-L antenna, an inverted-F antenna with a helical structure, an inverted-L antenna with a helical structure, a monopole antenna, a meandered monopole antenna, a dipole antenna, a balanced antenna, a printed helical antenna, a chip antenna, and a ceramic antenna. The embodiments are not limited in this context.

Figure 2B:
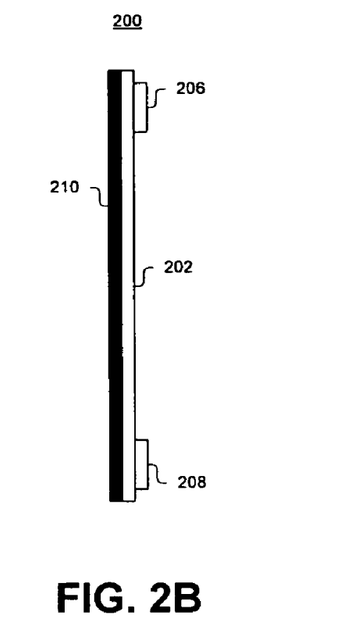
FIG. 2B illustrates a side view of the wireless device shown in FIG. 2A.

FIG. 2B illustrates a side view of the wireless device 200 of FIG. 2A. As shown, the wireless device 200 may comprise a ground plane 210. In various implementations, the ground plane 210 may improve antenna performance in talk position and reduce SAR. As shown, the ground plane 210 may extend underneath the first internal antenna 206 and the second internal antenna 208. The ground plane 210 may be required underneath the second internal antenna 208, for example, if a key pad is positioned at the edge of the PCB 204 and demands a ground layer underneath for its circuitry. In this embodiment, the first internal antenna 206 and the second antenna 208 may each comprise a planar inverted F-antenna, for example, including at least one read port and one or more ground ports. The embodiments are not limited in this context.

While the wireless device 200 shown in FIGS. 2A and 2B comprises an exemplary embodiment of an internal diversity antenna architecture, it can be appreciated that the placement or location of the first internal antenna 206 and the second internal antenna 208 within the wireless device 200 may be performed in accordance with various performance and design constraints. For example, the efficiency of each antenna may depend upon a proper relationship between the size and shape of the antenna and the wavelength of the targeted frequency. The specific frequency range that the antenna is designed to cover may dictate the optimal size of an antenna. Therefore, the specific implementation of the first internal antenna 206 and the second internal antenna 208 may vary depending upon such factors as the target operating frequencies, power consumption requirements, battery life, a form factor of the wireless device, transceiver operations, signal quality, weight considerations of the wireless device, and so forth.

Figure 3A:
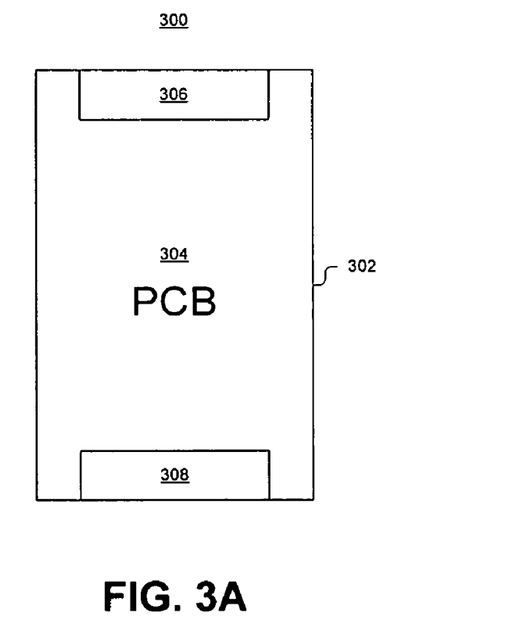
FIGS. 3A illustrates one embodiment of a wireless device having an internal diversity antenna architecture.

FIG. 3A illustrates one embodiment of a wireless device 300 having an internal diversity antenna architecture. In various embodiments, the wireless device 300 may be similar in some structural and operational aspects as wireless device 200, as described above.

As shown in FIG. 3A, the wireless device 300 may have an internal diversity antenna architecture comprising a first internal antenna 306 and a second internal antenna 308 disposed on the PCB 304 for achieving diversity. In this embodiment, the internal diversity antenna architecture may comprise a first internal antenna 306 located substantially at the top of the wireless device 300. For example, the first internal antenna 306 may be located substantially at the top of the housing 302 and/or the top of the PCB 304. The internal diversity antenna architecture may comprise a second internal antenna 308 located substantially at the bottom of the wireless device 300. For example, the second internal antenna 308 may be located substantially at the bottom of the housing 302 and/or the bottom of the PCB 304.

In some embodiments, the first internal antenna 306 may be integrated with the wireless device 300 such that an external surface of the first internal antenna 306 is substantially even, aligned or flush with the top of the housing 302 and/or the top of the PCB 304. In some embodiments, the second internal antenna 308 may be integrated with the wireless device 300 such that an external surface of the second internal antenna 308 is substantially even, aligned or flush with the bottom of the housing 302 and/or the bottom of the PCB 304. Thus, in some implementations, the first internal antenna 306 and the second internal antenna 308 may achieve maximum separation within the wireless device 300.

Figure 3B:
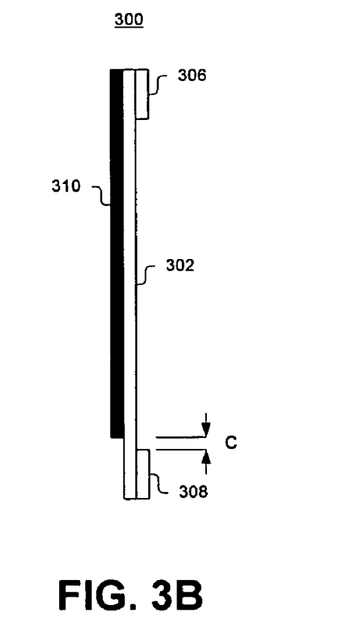
FIG. 3B illustrates a side view of the wireless device shown in FIG. 3A.

FIG. 3B illustrates a side view of the wireless device 300 of FIG. 3A. As shown, the wireless device 300 may comprise a ground plane 310 to improve antenna performance in talk position and reduce SAR. As shown, the ground plane 310 does not extend underneath the second internal antenna 308. In this embodiment, the second internal antenna 208 may be separated from the ground plane 310 by a clearance distance (C) that is no less than 5 mm (>5 mm). The first internal antenna 206 may comprise, for example, a planar inverted F-antenna. The second internal antenna 208 may comprise, for example, a monopole-antenna, an inverted-L antenna, a meandered monopole, a printed helical antenna, a dipole antenna, a balanced antenna, or other suitable antenna. The embodiments are not limited in this context.

Figure 4A:
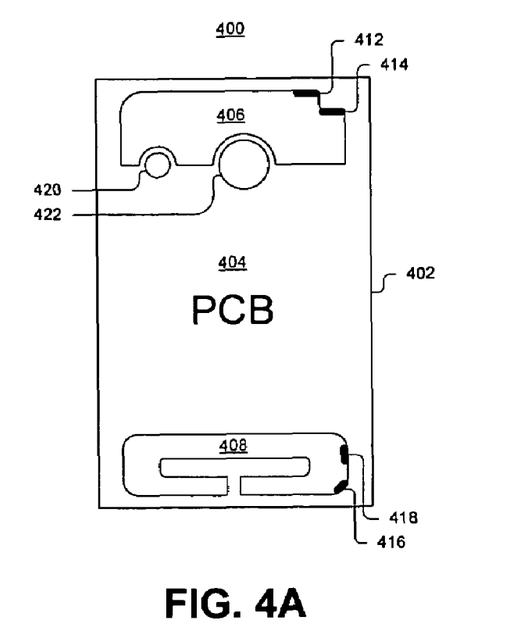
FIG. 4A illustrates one embodiment of a wireless device having an internal diversity antenna architecture.

FIG. 4A illustrates one embodiment of a wireless device 400 having an internal diversity antenna architecture. In various embodiments, the wireless device 400 may be similar in some structural and operational aspects as wireless device 200 and/or wireless device 300, as described above.

As shown in FIG. 4A, the wireless device 400 may have an internal diversity antenna architecture comprising a first internal antenna 406 and a second internal antenna 408 disposed on the PCB 404 for achieving diversity. In this embodiment, the first internal antenna 406 may comprise a first feed point 412 and a first ground point 414, and the second internal antenna 408 may comprise a second feed point 416 and a second ground point 418. The first internal antenna 406 may be located substantially near the top of the wireless device 400, and the second internal antenna 408 may be located substantially near the bottom of the wireless device 400.

In some embodiments, the first internal antenna 406 may be structured and arranged to border various internal components of the wireless device 400. As shown in FIG. 4A, for example, the first internal antenna 406 may border a camera 420 and a speaker 422 within the wireless device 400. In some embodiments, the second internal antenna 408 may be structured and arranged with a bent or folded configuration. As shown in FIG. 4A, for example, the second internal antenna 408 may have a bent configuration within the wireless device 400. While a particular arrangement may be shown by way of example, it can be appreciated that the first internal antenna 406 and/or the second internal antenna 408 may be arranged in other ways.

Figure 4B:
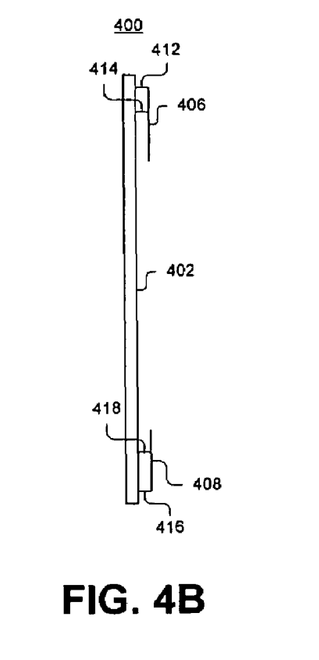
FIG. 4B illustrates a side view of the wireless device shown in FIG. 4A.

FIG. 4B illustrates a side view of the wireless device 400 of FIG. 4A. As shown, the wireless device 400 may comprise a housing 402, a first internal antenna 406 having a first feed point 412 and a first ground point 414, and a second internal antenna 408 having a second feed point 416 and a second ground point 418.

Although FIGS. 2A-4B show a limited number of elements in a certain topology by way of example, it can be appreciated that more or less elements in any suitable topology may be used in a wireless device as desired for a given implementation.

In various embodiments, for example, the antenna architecture may comprise three or more antennas. In some implementations, an additional antenna may comprise any suitable type of internal antenna disposed within the housing of a wireless device. In other implementations, an additional antenna may comprise any suitable type of external antenna such as a whip antenna, extendable antenna, antenna stubby, and so forth. The embodiments are not limited in this context.

In various embodiments, a wireless device may comprise elements such as a display, an input/output (I/O) device, a processor, a memory, and a transceiver, for example. One or more elements may be implemented using one or more circuits, components, registers, processors, software subroutines, modules, or any combination thereof, as desired for a given set of design or performance constraints.

The display may be implemented using any type of visual interface such as a liquid crystal display (LCD), a touch-sensitive display screen, and so forth. The I/O device may be implemented, for example, using an alphanumeric keyboard, a numeric keypad, a touch pad, input keys, buttons, switches, rocker switches, a stylus, and so forth. The embodiments are not limited in this context.

The processor may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processor may be implemented as a general purpose processor, such as a processor made by Intel® Corporation, Santa Clara, Calif. The processor also may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments, however, are not limited in this context.

The memory may be implemented using any machine-readable or computer-readable media capable of storing data, including both volatile and non-volatile memory. For example, memory 804 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory may be included on the same integrated circuit as a processor, or alternatively some portion or all of memory may be disposed on an integrated circuit or other medium, for example a hard disk drive, that is external to the integrated circuit of a processor. The embodiments are not limited in this context.

The transceiver may be implemented, for example, by any transceiver suitable for operating at a given set of operating frequencies and wireless protocols for a particular wireless system. For example, the transceiver may be a two-way radio transceiver arranged to operate in the 824-894 MHz frequency band (GSM), the 1850-1990 MHz frequency band (PCS), the 1575 MHz frequency band (GPS), the 824-860 MHz frequency band (NAMPS), the 1710-2170 MHz frequency band (WCDMA/UMTS), or other frequency bands.

In various embodiments, an antenna may be electrically connected to a transceiver operatively associated with a signal processing circuit or processor positioned on a PCB. In order to increase power transfer, the transceiver may be interconnected to an antenna such that respective impedances are substantially matched or electrically tuned to compensate for undesired antenna impedance. In some cases, the transceiver may be implemented as part of a chip set associated with a processor. The embodiments are not limited in this context.

Figure 5:
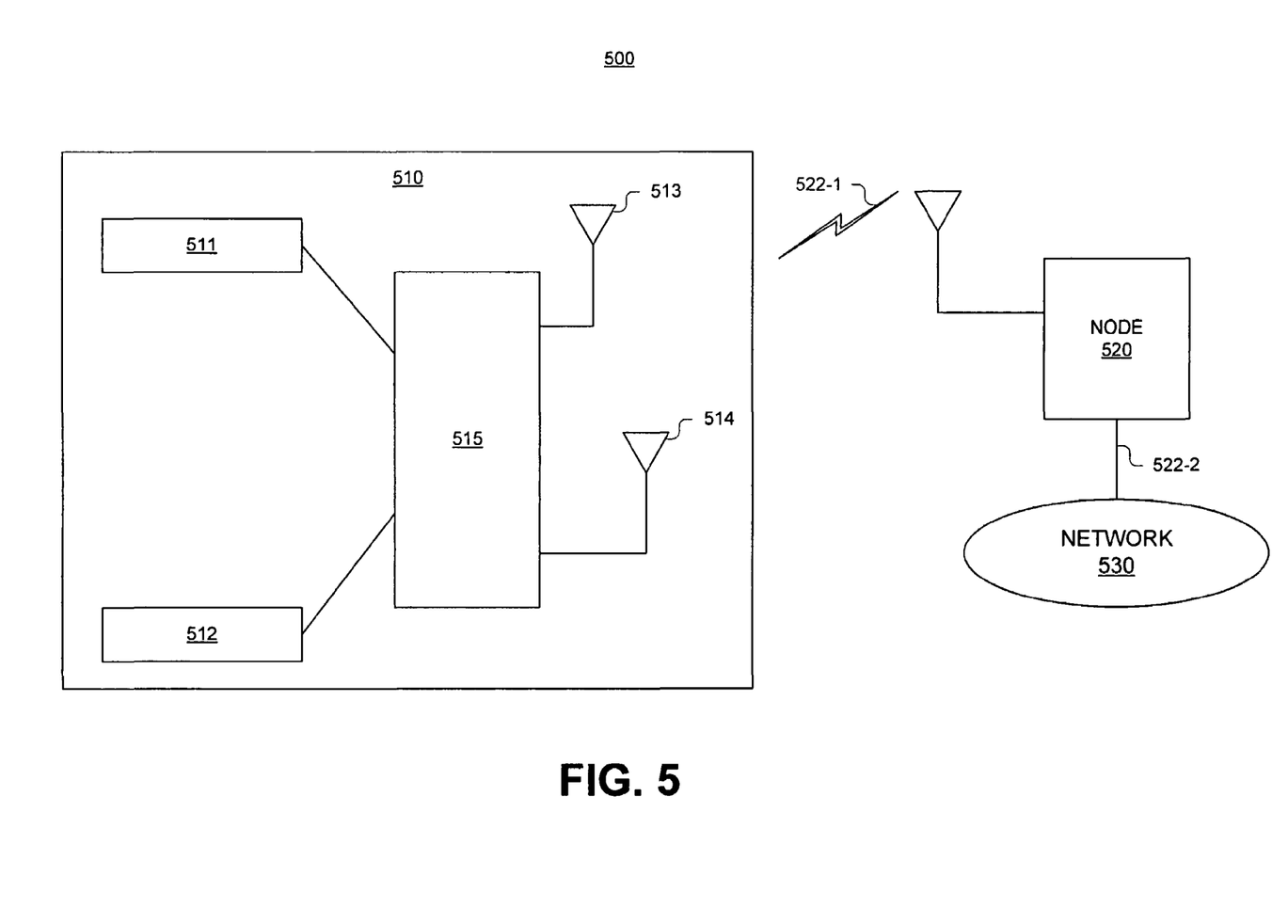
FIG. 5 illustrates one embodiment of a communications system.

FIG. 5 illustrates one embodiment of a communications system 500 having multiple nodes. A node may comprise any physical or logical entity for communicating information in the communications system 500 and may be implemented as hardware, software, or any combination thereof, as desired for a given set of design parameters or performance constraints. Although FIG. 5 is shown with a limited number of nodes in a certain topology, it may be appreciated that communications system 500 may include more or less nodes in any type of topology as desired for a given implementation. The embodiments are not limited in this context.

In various embodiments, a node may comprise a processing system, a computer system, a computer sub-system, a computer, a laptop computer, an ultra-laptop computer, a portable computer, a handheld computer, a PDA, a cellular telephone, a combination cellular telephone/PDA, a microprocessor, an integrated circuit, a PLD, a DSP, a processor, a circuit, a logic gate, a register, a microprocessor, an integrated circuit, a semiconductor device, a chip, a transistor, and so forth. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

Communications system 500 may be implemented as a wired communication system, a wireless communication system, or a combination of both. Although system 100 may be illustrated using a particular communications media by way of example, it may be appreciated that the principles and techniques discussed herein may be implemented using any type of communication media and accompanying technology. The embodiments are not limited in this context.

When implemented as a wired system, for example, communications system 500 may include one or more nodes arranged to communicate information over one or more wired communications media. Examples of wired communications media may include a wire, cable, PCB, backplane, switch fabric, semiconductor material, twisted-pair wire, co-axial cable, fiber optics, and so forth. The communications media may be connected to a node using an I/O adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, system 100 may include one or more wireless nodes arranged to communicate information over one or more types of wireless communication media, sometimes referred to herein as wireless shared media. An example of a wireless communication media may include portions of a wireless spectrum, such as the radio-frequency (RF) spectrum. The wireless nodes may include components and interfaces suitable for communicating information signals over the designated wireless spectrum, such as one or more antennas, wireless transceivers, amplifiers, filters, control logic, and so forth. As used herein, the term "transceiver" may be used in a very general sense to include a transmitter, a receiver, or a combination of both. The embodiments are not limited in this context.

As shown, the communications system 500 may include a wireless node 510. In various embodiments, the wireless node 510 may be implemented as a wireless device such as wireless device 200, 300, or 400. Examples of wireless node 510 also may include any of the previous examples for a node as previously described.

In one embodiment, for example, the wireless node 510 may comprise a primary receiver 511, a secondary receiver 512, a first antenna 513, a second antenna 514, and a switching system 515. The primary receiver 511 and the secondary receiver 512 may be implemented, for example, by any suitable receiver for receiving electrical energy in accordance with a given set of performance or design constraints as desired for a particular implementation In various embodiments, the first antenna 513 and the second antenna 514 may be similar in structure and operation as first and second internal antennas, as described with reference to FIGS. 2A-4. In some implementations, the first antenna 513 and the second antenna 514 may be configured for reception as well as transmission. The first antenna 513 and the second antenna 514 may be arranged to operate at the same time for transmitting, receiving, or both.

The switching system 515 may be implemented, for example, by any suitable processor or logic device, as previously described. In various embodiments, the switching system 515 may be arranged to automatically select one of the first antenna 513 and the second antenna 514 as the primary antenna and the other as the secondary antenna. The selection may depend, for example, on which of the first antenna 513 and the second antenna 514 has better performance at a given point in time. For example, the efficiency of the first antenna 513 may be higher than the second antenna 514 in hand, while the efficiency of the second antenna 514 may be higher than the first antenna 513 in free space. In such case, when the wireless node 510 is held, the switching system 515 may automatically select the first antenna 513 as the primary antenna, connect the first antenna 513 to the primary receiver 511, and connect the second antenna 514 to the secondary receiver 512. In free space, the switching system 515 may automatically select the second antenna 513 as the primary antenna, connect the second antenna 514 to the primary receiver 511, and connect the first antenna 513 to the secondary receiver 512. The embodiments are not limited in this context.

In some embodiments, the switching system 515 may be arranged to automatically share reception between the first antenna 513 and the second antenna 514. The sharing may allocated equally or unequally. For example, the allocation between the first antenna 513 and the second antenna 514 may be made using a weighting factor based on which of the first antenna 513 and the second antenna 514 has better performance at a given point in time. In such case, the antenna having the higher weighting factor may be designated as the primary receiver. The embodiments are not limited in this context.

In various embodiments, the communications system 500 may include a wireless node 520. Wireless node 520 may comprise, for example, a mobile station or fixed station having wireless capabilities. Examples for wireless node 520 may include any of the examples given for wireless node 510, and further including a wireless access point, base station or node B, router, switch, hub, gateway, and so forth. In one embodiment, for example, wireless node 520 may comprise a base station for a cellular radiotelephone communications system. Although some embodiments may be described with wireless node 520 implemented as a base station by way of example, it may be appreciated that other embodiments may be implemented using other wireless devices as well. The embodiments are not limited in this context.

Communications between the wireless nodes 510, 520 may be performed over wireless shared media 522-1 in accordance with a number of wireless protocols. Examples of wireless protocols may include various wireless local area network (WLAN) protocols, including the Institute of Electrical and Electronics Engineers (IEEE) 802.xx series of protocols, such as IEEE 802.11a/b/g/n, IEEE 802.16, IEEE 802.20, and so forth. Other examples of wireless protocols may include various WWAN protocols, such as GSM cellular radiotelephone system protocols with GPRS, CDMA cellular radiotelephone communication systems with 1xRTT, EDGE systems, EV-DO systems, EV-DV systems, HSDPA systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth. Yet another example of wireless protocols may include near-field communication techniques and protocols, such as electromagnetic induction (EMI) techniques. An example of EMI techniques may include passive or active radio-frequency identification (RFID) protocols and devices. Other suitable protocols may include Ultra Wide Band (UWB), Digital Office (DO), Digital Home, Trusted Platform Module (TPM), ZigBee, and other protocols. The embodiments are not limited in this context.

In one embodiment, wireless nodes 510, 520 may comprise part of a cellular communication system. Examples of cellular communication systems may include Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) cellular radiotelephone systems, Extended-TDMA (E-TDMA) cellular radiotelephone systems, Narrowband Advanced Mobile Phone Service (NAMPS) cellular radiotelephone systems, third generation (3G) systems such as Wide-band CDMA (WCDMA), CDMA-2000, Universal Mobile Telephone System (UMTS) cellular radiotelephone systems compliant with the Third-Generation Partnership Project (3GPP), and so forth. The embodiments are not limited in this context.

In addition to voice communication services, the wireless nodes 510, 520 may be arranged to communicate using a number of different wireless wide area network (WWAN) data communication services. Examples of cellular data communication systems offering WWAN data communication services may include a GSM with General Packet Radio Service (GPRS) systems (GSM/GPRS), CDMA/1xRTT systems, Enhanced Data Rates for Global Evolution (EDGE) systems, Evolution Data Only or EVDO systems, Evolution for Data and Voice (EV-DV) systems, High Speed Downlink Packet Access (HSDPA) systems, and so forth. The embodiments are not limited in this respect.

In one embodiment, the communication system 500 may include a network 530 connected to the wireless node 520 by wired communications medium 522-2. The network 530 may comprise additional nodes and connections to other networks, including a voice/data network such as the Public Switched Telephone Network (PSTN), a packet network such as the Internet, a local area network (LAN), a metropolitan area network (MAN), a wide area network (WAN), an enterprise network, a private network, and so forth. The network 530 also may include other cellular radio telephone system equipment, such as base stations, mobile subscriber centers, central offices, and so forth. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. A wireless device, comprising:
   a housing enclosing a printed circuit board;
   a first diversity antenna disposed on the printed circuit board;
   a second diversity antenna disposed on the printed circuit board and internal to said housing, said second diversity antenna positioned substantially near a bottom of said housing or a bottom of said printed circuit board; and said first diversity antenna comprising a primary antenna and said second diversity antenna comprising a secondary antenna, and wherein said first diversity antenna and said second diversity antenna are both positioned parallel to a ground plane.

2. The wireless device of claim 1, said first diversity antenna internal to said housing.

3. The wireless device of claim 2, said first diversity antenna positioned substantially near a top of said housing or a top of said printed circuit board.

4. The wireless device of claim 1, said primary antenna configured for transmission and said secondary antenna configured for transmission and reception.

5. The wireless device of claim 4, said primary antenna configured for reception.

6. The wireless device of claim 2, said wireless device having a length greater than 0.3 wavelength of a lowest operating frequency.

7. The wireless device of claim 2, said first diversity antenna and said second diversity antenna separated by a distance greater than or equal to a quarter wavelength of a lowest operating frequency of said wireless device.

8. The wireless device of claim 1, said first diversity antenna and said second diversity antenna to operate in one or more frequency bands.

9. The wireless device of claim 1, said first diversity antenna and said second diversity antenna combining to achieve Evolution Data Optimized diversity.

10. The wireless device of claim 1, said second diversity antenna comprising at least one of a monopole-antenna, an inverted-L antenna, a meandered monopole, a printed helical antenna, a dipole antenna, or a balanced antenna.

11. The wireless device of claim 1, said second diversity antenna comprising a planar inverted F-antenna.

12. The wireless device of claim 1, further comprising a ground plane.

13. The wireless device of claim 12, said second diversity antenna separated from said ground plane by a clearance distance no less than 5 mm.

14. The wireless device of claim 12, wherein said ground plane extends underneath said second diversity antenna.

15. A wireless device, comprising:
a housing enclosing a printed circuit board;
a first diversity antenna internal to said housing and disposed on the printed circuit board;
a second diversity antenna internal to said housing and disposed on the printed circuit board, said second diversity antenna positioned substantially at a bottom of said housing or a bottom of said printed circuit board; and
said first diversity antenna comprising a primary antenna and said second diversity antenna comprising a secondary antenna, and wherein said first diversity antenna and said second diversity antenna are both positioned parallel to a ground plane.

16. The wireless device of claim 15, said first diversity antenna positioned substantially at a top of said housing or a top of said printed circuit board.

17. A communications system comprising a wireless node, said wireless node comprising:
a primary receiver;
a secondary receiver;
a first antenna and a second antenna disposed on a printed circuit board, with both said first and second antennas positioned parallel to a ground plane; and
a switching system to automatically select one of said first antenna and said second antenna as a primary antenna and the other of said first antenna and said second antenna as a secondary antenna.

18. The communications system of claim 17, said switching system to connect said primary antenna to said primary receiver and to connect said secondary antenna to said secondary receiver.

19. The communications system of claim 17, said switching system to share reception between said primary antenna and said secondary antenna.

* * * * *